United States Patent
Hansen

Patent Number: 5,933,656
Date of Patent: Aug. 3, 1999

[54] SYSTEM FOR INTERFACING HOST COMPUTER TO MULTIPLE PERIPHERAL DEVICES USING DAISY-CHAINABLE BUS AND FEDERATED COMPUTATIONAL INPUT/OUTPUT CIRCUIT CARD ASSEMBLIES

[75] Inventor: Dennis D. Hansen, Grapevine, Tex.

[73] Assignee: Raytheon Company, Lexington, Mass.

[21] Appl. No.: 08/878,472

[22] Filed: Jun. 18, 1997

[51] Int. Cl.⁶ ........................................... G06F 13/40
[52] U.S. Cl. ............................. 395/882; 395/884
[58] Field of Search ................................. 395/309, 281, 395/800, 200.02, 325, 828, 852, 882, 884; 375/222

[56] References Cited

U.S. PATENT DOCUMENTS

| | | | |
|---|---|---|---|
| 4,100,601 | 7/1978 | Kaufman et al. | 395/852 |
| 5,168,547 | 12/1992 | Miller et al. | 395/325 |
| 5,264,958 | 11/1993 | Johnson | 395/325 |
| 5,550,861 | 8/1996 | Chan et al. | 375/222 |
| 5,555,374 | 9/1996 | Armerding et al. | 395/200.02 |
| 5,564,055 | 10/1996 | Asnaashari et al. | 395/800 |
| 5,594,879 | 1/1997 | Belmont | 395/309 |
| 5,611,055 | 3/1997 | Krishan et al. | 395/281 |
| 5,666,557 | 9/1997 | Cassidy et al. | 395/828 |

*Primary Examiner*—Thomas C. Lee
*Assistant Examiner*—Chien Yuan
*Attorney, Agent, or Firm*—Robin R. Longo; Glenn H. Lenzen, Jr.

[57] ABSTRACT

A federated system comprising a plurality of input/output circuit card assemblies and a Firewire or other daisy-chainable bus that provides low latency communication between a host computer and peripheral devices. A single circuit card assembly is used to interface to each peripheral device, and communication between the host computer and peripheral device may be made using a plurality of different communication protocols. The input/output circuit card assembly is daisy-chainable and incorporates circuitry that implements a bus constructed to Firewire (IEEE-1394) and other electrical specifications.

8 Claims, 5 Drawing Sheets

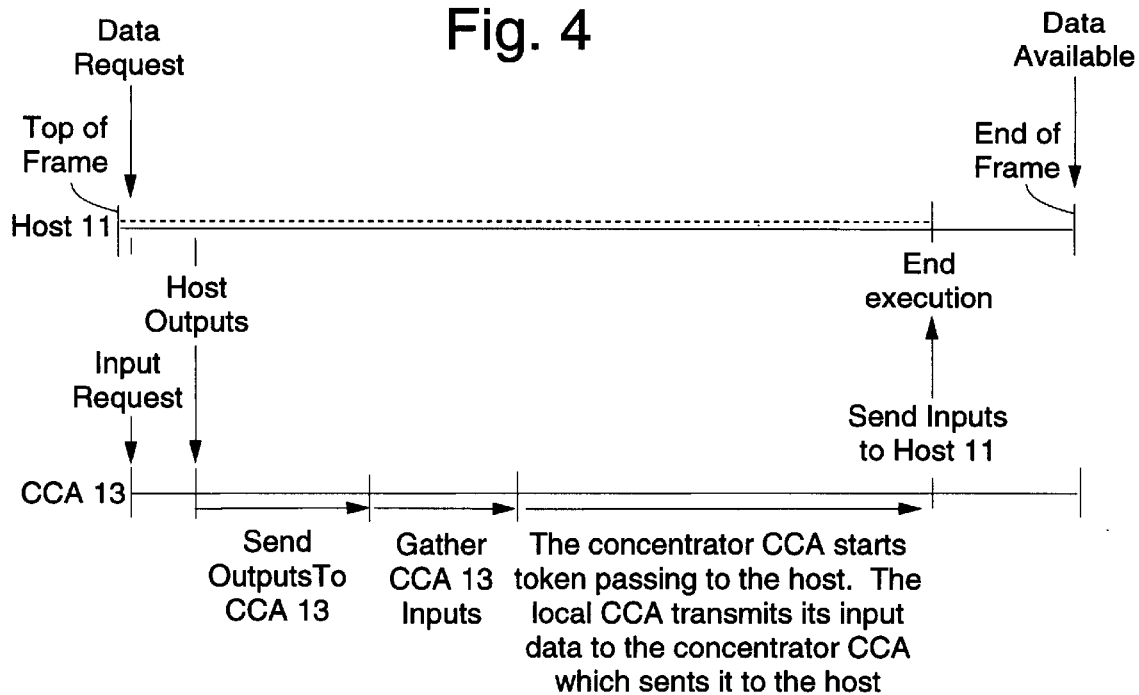
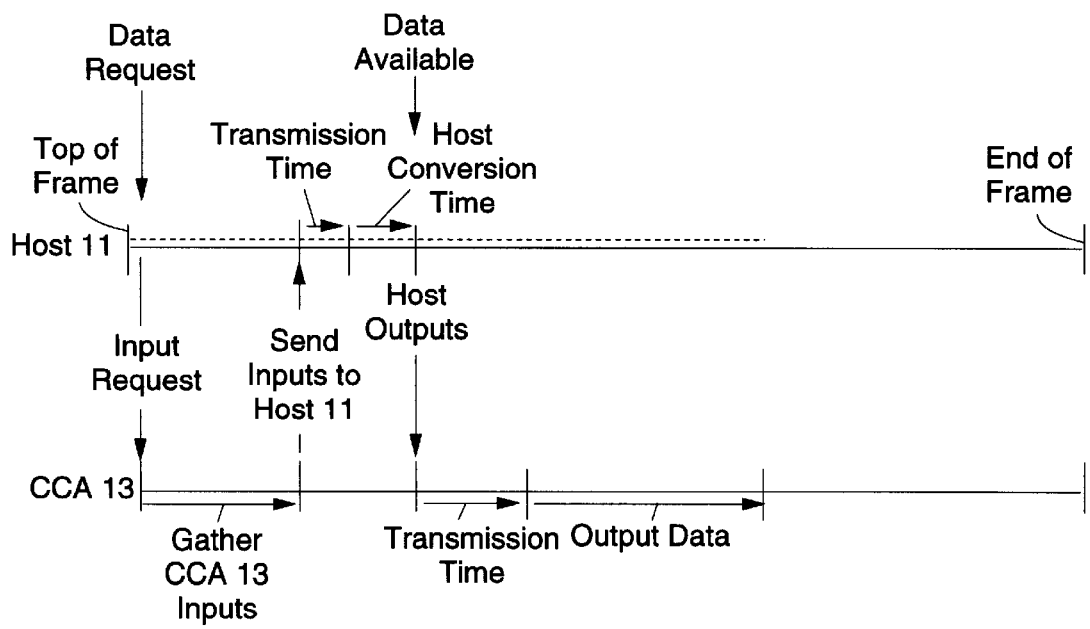

SYSTEM FOR INTERFACING HOST COMPUTER TO MULTIPLE PERIPHERAL DEVICES USING DAISY-CHAINABLE BUS AND FEDERATED COMPUTATIONAL INPUT/OUTPUT CIRCUIT CARD ASSEMBLIES

BACKGROUND

The present invention relates generally to apparatus for communicating between a host computer and peripheral devices, and more particularly, to a system having a plurality of federated computational input/output circuit card assemblies and a daisy chainable bus that provides communication between a host computer and peripheral devices, and which may advantageously be employed for use with training and simulation systems, and the like.

The assignee of the present invention designs and manufactures training systems, such as flight simulators for military aircraft, such as the F-16, F-18 and F-22 aircraft. Older conventional training systems employed a multiplicity of card types with point to point wiring, mass terminated cables and centrally located housing of devices in the human interface to the system. Older conventional training systems also sampled information using a time sequential framing methodology which propagated data on a subsequent frame from the sample frame. Most training systems use input and output (I/O) devices such as joysticks, switches, potentiometers, electromechanical gauges, LED and LCD displays, CRT displays, and panel lights to provide the human interface to a host computer that implements the simulation. Newer training systems have fewer analog type devices with more integrated digital devices and circuitry for many of the input and output devices, excluding display panel lights, which were higher current devices compared with digital devices.

In the past, communication between the host computer and the peripheral input and output devices was accomplished in a dedicated manner by communications circuitry that was incorporated on a motherboard. However, this dedicated communications circuitry was not compatible with multiple communication protocols that would best match the system's requirements.

Furthermore, in conventional systems, dedicated racks of I/O interface cards were coupled to a dedicated backplane and were typically located as much as 10–12 feet away from the input and output devices to which they were interfaced. A great deal of wiring was required to implement the I/O scheme, and particularly involved a great deal of labor and associated costs. Typically, the card racks were coupled to mass terminated wiring blocks and from the wiring blocks to the individual input and output devices, which was a potential source of problems due to the large number of added terminations. Furthermore, the fact that the I/O cards were located a great distance from the input and output devices required huge wiring looms to be run and the long wiring runs caused unwanted electrical noise problems. In addition prior methodology has produced systems that provide "stale" data to the host computer inherent in the sampling methodology.

It would therefore be an advantage to have apparatus for communicating between a host computer and peripheral input and output devices that provides flexibility in communicating with the input and output devices. It would also be an advantage to have apparatus that eliminates excess wiring and permits location of I/O interface cards in closer proximity to the device that to which the card interfaces. Additionally providing the "freshest" data to a host computer would reduce simulator latency and "simulation misses" due to using data that is out of date.

Accordingly, it is an objective of the present invention to provide for a input/output circuit card assembly that is coupled between a host computer and peripheral devices by way of a daisy-chainable flexible bus constructed in accordance with Firewire (IEEE-1394), RS-232, RS-485, RS-422, or similar specifications that provides communication between the host computer and peripheral devices using a plurality of communication protocols. It is also an objective of the present invention to provide a system that provides the most recent data sampling possible.

SUMMARY OF THE INVENTION

To meet the above and other objectives, the present invention provides for a system comprising a plurality of federated computational input/output circuit card assemblies and a multiplicity of busses that provides communication between a host computer and peripheral devices. A single circuit card assembly is used to interface to each peripheral device, and communication between the host computer and peripheral device may be made using a plurality of different communication protocols and electrical constructs. The input/output circuit card assembly is daisy-chainable and incorporates circuitry that implements a daisy-chainable bus constructed to Firewire (IEEE-1394), RS-232, RS-422, RS-485 or other daisy-chainable or point to point specifications.

The present system interfaces a host computer to multiple input and output peripheral devices, and comprises a host computer having a daisy-chainable bus, and a plurality of substantially identical federated computational input/output circuit card assemblies that each comprise the daisy-chainable bus. Each circuit card assembly is individually connected to a specific peripheral device and implements an input or output function that interfaces to that specific peripheral device. Furthermore, each circuit card assembly is connected the host computer by way of the daisy-chainable bus. The host computer and each of the input/output circuit card assemblies contain software that communicates over the daisy-chainable bus.

The present invention, in one of its implementations, replaces a fixed backplane used in conventional systems with a daisy-chainable flexible bus, constructed to IEEE-1394 (Firewire), RS-232, RS-422 or RS-485, or other daisy-chainable specifications. Thus, in the present invention, daisy-chained circuit cards directly interface between the host computer and the peripheral input and output devices by way of the Firewire, RS-232, RS-422, RS-485 and other busses.

The input/output circuit card assembly comprises a plurality of daughterboards that are used to communicate with different protocols. High speed daughterboards have an IEEE 1394 interface that provides 100 Mbit to 200 Mbit per second communications rates with ultra-low latency. Low speed daughterboards contains RS-232, RS-422, and RS-485 interfaces that provide communications from 9600 baud to 1 Mbaud rates. Mid speed range daughterboards contains a Universal Serial Bus (USB) interface to provide communications from 1 Mbit to 50 Mbit per second rates. Additional communications interfaces using additional daughterboards are provided as required that interface to the input/output circuit card assembly using parallel address/data and serial data streams.

The input/output circuit card assembly has a continuous sampling analog to digital converter (approximately 1 KHz and 8 channels) with settable filter bands. Input samples are gathered at approximately 1 KHz for each of the 8 channels, compared to the last value, and if they are above the filter value, are stored for retrieval at the next host computer initiated "gather data input" command. Filter values are settable from 0 up a maximum of 4095 using the full capability of the 12 bit analog to digital converter. This feature reduces the requirements for bandwidth between the host computer and input/output circuit card assembly.

Digital data destined to be converted to an analog output (4 channels) is filtered using software operating in the host computer. Digital data destined to be converted to analog output has the capability of sending a start value then delta value and a count, allowing the input/output circuit card assembly to offload the host computer from smoothly ramping an analog value over successive frames. Analog outputs have 100% loopback within the analog to digital converter circuitry. Both analog output and input sections may thus be tested for operation. Digital outputs and inputs (32 total) may be used as either outputs or inputs on byte boundaries. Each inputs have pull-up resistors. Digital outputs and inputs have 100% loopback capability (within a programmable gate array of the circuit card assembly).

Plus and minus reference voltages of 10.00 volts are available at 50 ma for use by potentiometers. Lamp outputs (16) are driven by low resistance HexFETs with both source and drain available to a user (with up to 60 volt capability). Continuous currents of 1 amp and 3 amps peak are provided. 100% loopback testing with variable voltage level sensing is provided.

An EEPROM is provided in the input/output circuit card assembly and a software loader is built into an EPROM in the on board CPU that allows updating operational software without replacing components. The EEPROM also allows updating the input/output circuit card assembly from a remote source, such as from a central plant by way of a modem.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 4 illustrates the timing of data collection and reduction for prior art;

FIG. 5 illustrates timing of data transfer between the input/output circuit card assemblies and host computer of the system of FIG. 1.

DETAILED DESCRIPTION

Figure 1:
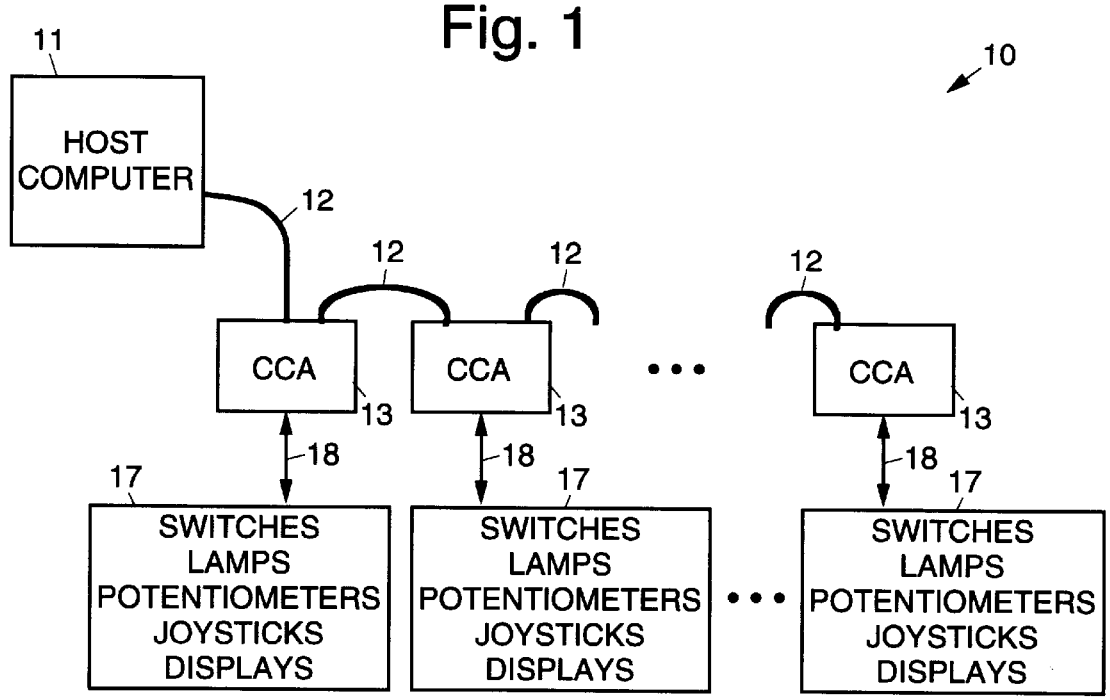
FIG. 1 illustrates a system in accordance with the principles of the present invention for interfacing a host computer to multiple input and output devices using a plurality of federated computational input/output circuit card assemblies.

Referring to the drawing figures, FIG. 1 illustrates a system 10 in accordance with the principles of the present invention for interfacing a host computer 11 to multiple input and output devices 17 using a plurality of federated computational input/output circuit card assemblies 13. The host computer 11 is coupled to a plurality of substantially identical input/output circuit card assemblies 13 by way of a Firewire (IEEE-1394) or other daisy-chained bus 12. Each of the plurality of input/output circuit card assemblies 13 is individually connected to peripheral input or output devices 17. Each input/output circuit card assembly 13 is physically located adjacent to the peripheral devices 17 it is connected to. Each input/output circuit card assembly 13 is connected physically to its respective input or output device 17 using a plurality of short fly wires 18, for example, without intervention of other wiring mechanisms.

Thus, there is no signal distribution wiring, card rack, or backplane employed in the present system 10. Instead, each input/output circuit card assembly 13 is directly connected to a specific peripheral device 17, such as a panel, control device or controlled device, and implements a specific input or output function to interface to that specific device 17. Typical peripheral devices 17 include switches, lamps potentiometers, joysticks and displays, and the like. The host computer 11 and each of the input/output circuit card assemblies 13 contain software that implements communication over the Firewire (IEEE-1394) or other daisy-chained bus 12.

Figure 1A:
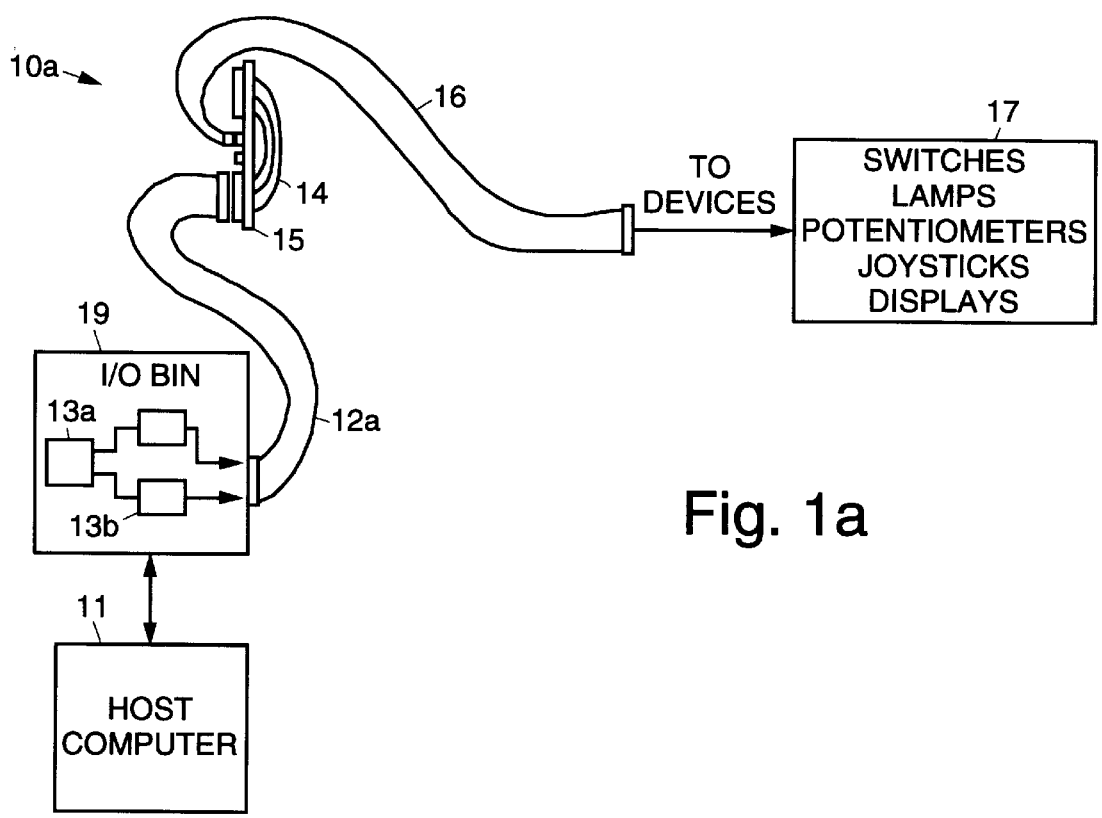
FIG. 1a illustrates a typical prior art system.

Elimination of card racks, backplanes and other cable runs and wiring significantly reduces maintainability requirements, simplifies design, and enhances noise reduction by locating the I/O function at the source or destination. An example of a atypical prior art system 10a is shown in FIG. 1a. An I/O bin 19 is used to interface between the host computer 11 and each of the peripheral devices 17. The I/O bin 19 houses a concentrator circuit card assembly 13a that interfaces to a plurality of individual circuit card assembly 13b that is required to interface to a particular peripheral devices 17. Each individual circuit card assembly 13b is coupled to an interconnection panel 15 via cable 12a where each I/O signal is redistributed to its destination connector via wirewrap connections 14. Each I/O function is then routed to their respective locations via a cable 16 that connects to a specific peripheral device 17. Similar conventional mechanisms exist that use patch panels and multiple cables of less than optimal length, which induce additional material and labor costs as well as probablistically inducing noise problems.

Specifically for the system 10 of FIG. 1, each I/O function provided by the individual input/output circuit card assemblies 13 is on the IEEE 1394 bus 12, which may be daisy chained with up to 63 nodes (circuit card assemblies 13) and communicates at 100 or 200 Megabits per second to the host computer 11. Each peripheral device 17 (and circuit card assembly 13) has a unique address, which allows the host computer 11 to download specific configurations to each node at power up, allowing a single circuit board type to meet disparate requirements, and therefore significantly reducing the life cycle cost for the system 10.

The use of an IEEE 1394 bus 12, for example, provides the ability to replace or "hot swap" individual input/output circuit card assemblies 13 if they become defective, which significantly reduces down time of the system 10 if a failure occurs. Extremely low latency, which is the time between the initiation of an action, such as operating a switch and the beginning of a response, such as lighting of an indicator in response to operation of the switch, are desirable attributes that are provided by using the input/output circuit card assemblies 13.

Figure 2:
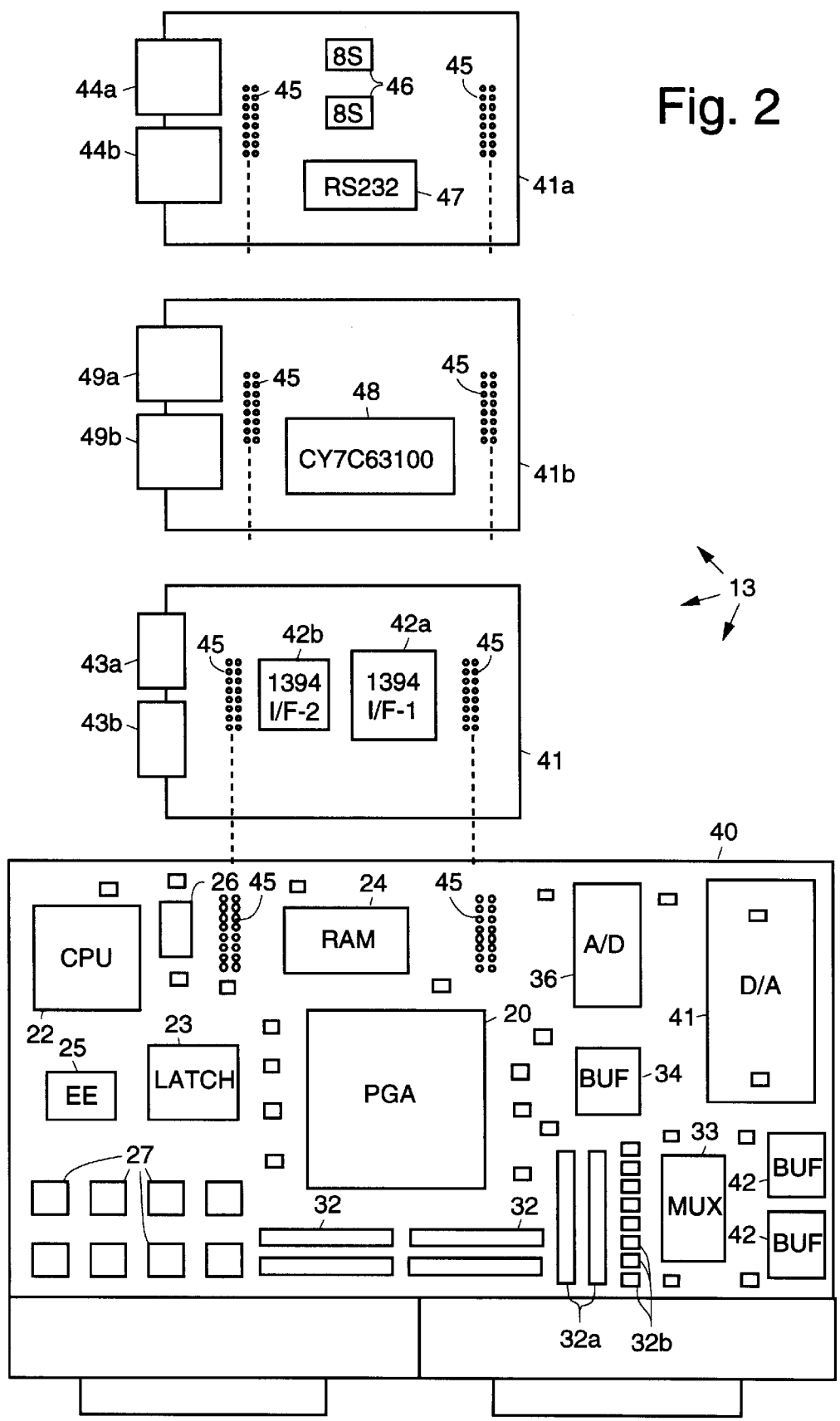
FIG. 2 shows a layout of an input/output circuit card assembly of the system of FIG. 1 including a plurality of daughterboard types.

FIG. 2 shows a layout of a reduced to practice embodiment of the input/output circuit card assembly 13 used in the system 10 of FIG. 1. The circuit card assembly 13 includes a motherboard 40 and one or more daughterboards 41. The circuit card assembly 13 comprises one card set for each panel or other location requiring I/O interfacing.

A CPU 22 is connected via a parallel address/data bus (not shown) to system RAM 24, analog to digital (A/D) converter 36, digital to analog (D/A) converter 41, analog multiplexer (MUX) 33, EEPROM device 25, and programmable gate array (PGA) 20. A crystal oscillator 26 is coupled to the CPU 22. A plurality of field effect transistors (HexFETs) 27 are provided to drive lamp outputs and pullup resistors 32 are provided for each of the digital inputs. The CPU 22 and its on-board peripherals act in coordination to input and output data at the request of the host computer 11. The programmable gate array 20 replaces numerous discrete devices that buffer, latch and memory map data and control lines from the CPU 22. In addition the digital I/O function is entirely generated by the programmable gate array 20, which provides extensibility and flexible on-byte boundary inputs or outputs. Connectors 45 provide a parallel data, address and control line interface to the daughterboards 41.

A reduced to practice embodiment of the input/output circuit card assembly 13 contains a continuous sampling analog to digital converter 36 (approximately 1 KHz and 8 channels) with settable filter bands. Input samples are gathered at approximately 1 KHz for each of the 8 channels, compared to the last value, and if they are above a filter value, are stored for retrieval at the next "gather data input" command initiated by the host computer 11. Filter values are settable from 0 up a maximum of 4095 using the full capability of the 12 bit analog to digital converter 36. This feature reduces the requirements for bandwidth between the host computer 11 and input/output circuit card assembly 13. Buffers 34 provide a high input impedance to each analog input (8). A simple low pass filter function for each input is implemented using resistor arrays 32a and capacitors 32b.

Digital data destined to be converted to an analog output (4 channels) is filtered using software operating in the host computer 11. Digital data destined to be converted to analog output has the capability of sending a start value then delta value and a count, allowing the input/output circuit card assembly 13 to offload the host computer 11 from smoothly ramping an analog value over successive frames. Analog outputs have 100% loopback within the analog to digital converter 36. Both analog output and input sections may thus be tested for operation. Digital outputs and inputs (32 total) may be used as either outputs or inputs on byte boundaries. Each inputs have pull-up resistors 32. Digital outputs and inputs have 100% loopback capability (within the programmable gate array 20).

Plus and minus reference voltages of 10.00 volts are available at 50 ma for use by potentiometers. Buffers 42 are provided that interface between the reference voltages and the outputs. Lamp outputs (16) are driven by low resistance HexFETs 27 with both source and drain available to a user (with up to 60 volt capability). Continuous currents of 1 amp and 3 amps peak are provided. 100% loopback testing with variable voltage level sensing is provided.

The EEPROM 25 is provided on the input/output circuit card assembly 13 and a software loader is built into an EPROM (not shown) in the CPU 22 that allows updating operational software without replacing components. The EEPROM 25 also allows updating the input/output circuit card assembly 13 from a remote source, such as from a central plant by way of a modem.

More particularly, software is resident within the CPU 22 to perform a boot function via the EEPROM device 25. At power up, the CPU 22 reads specific memory address within the EEPROM device 25 to determine where to start and stop its loading of operational code from EEPROM device 25 into the RAM 24. After bootstraping its operational code into the RAM 24, the CPU 22 executes built in test of each of the local peripheral devices. After either completing or failing this task the attached daughterboard 41 is also tested and then upon receipt of notification of host messaging, test and results are transmitted signifying (results good) that the motherboard 40 and daughterboard 41 are ready for operation.

The present invention may employ a plurality of different daughterboards 41 that are used to communicate with different protocols. High speed daughterboards 41 have an IEEE 1394 interface that provides 100 Mbit to 200 Mbit per second communications rates with ultra-low latency. Low speed daughterboards 41 contains RS-232, RS-422, and RS-485 interfaces that provide communications from 9600 baud to 1 Mbaud rates. Mid speed range daughterboards 41 contains a Universal Serial Bus (USB) interface to provide communications from 1 Mbit to 50 Mbit per second rates. Additional communications interfaces using additional daughterboards may be readily provided to interface to the input/output circuit card assembly 13 using parallel address/data and serial data streams, for example.

By way of example, the IEEE 1394 daughterboard 41 comprises two DIN connectors 43a, 43b, which provide input and output to the communication bus. Included on the daughterboard 41 is a IEEE 1394 peripheral link layer controller 42a, IEEE 1394 analog physical layer device 42b, and connectors 45 that provide a parallel data, address and control line interface to the motherboard 40. The RS-485/RS-422 and RS-232 daughterboards 41a are comprised of two RJ-45 plug connectors 44a, 44b, two low power differential bus/line transceivers 46 providing interface capability to either RS-422 or RS-485 line/bus types. Additionally, a high speed charge pump type RS-232 interface 47 is provided. Connectors 45 provide a parallel data, address and control line interface to the motherboard 40. The USB I/F daughterboard 41b is comprised of two USB connectors 49a, 49b and a USB microcontroller 48. Connectors 45 provide a parallel data, address and control line interface to the motherboard 40.

Figure 3A:
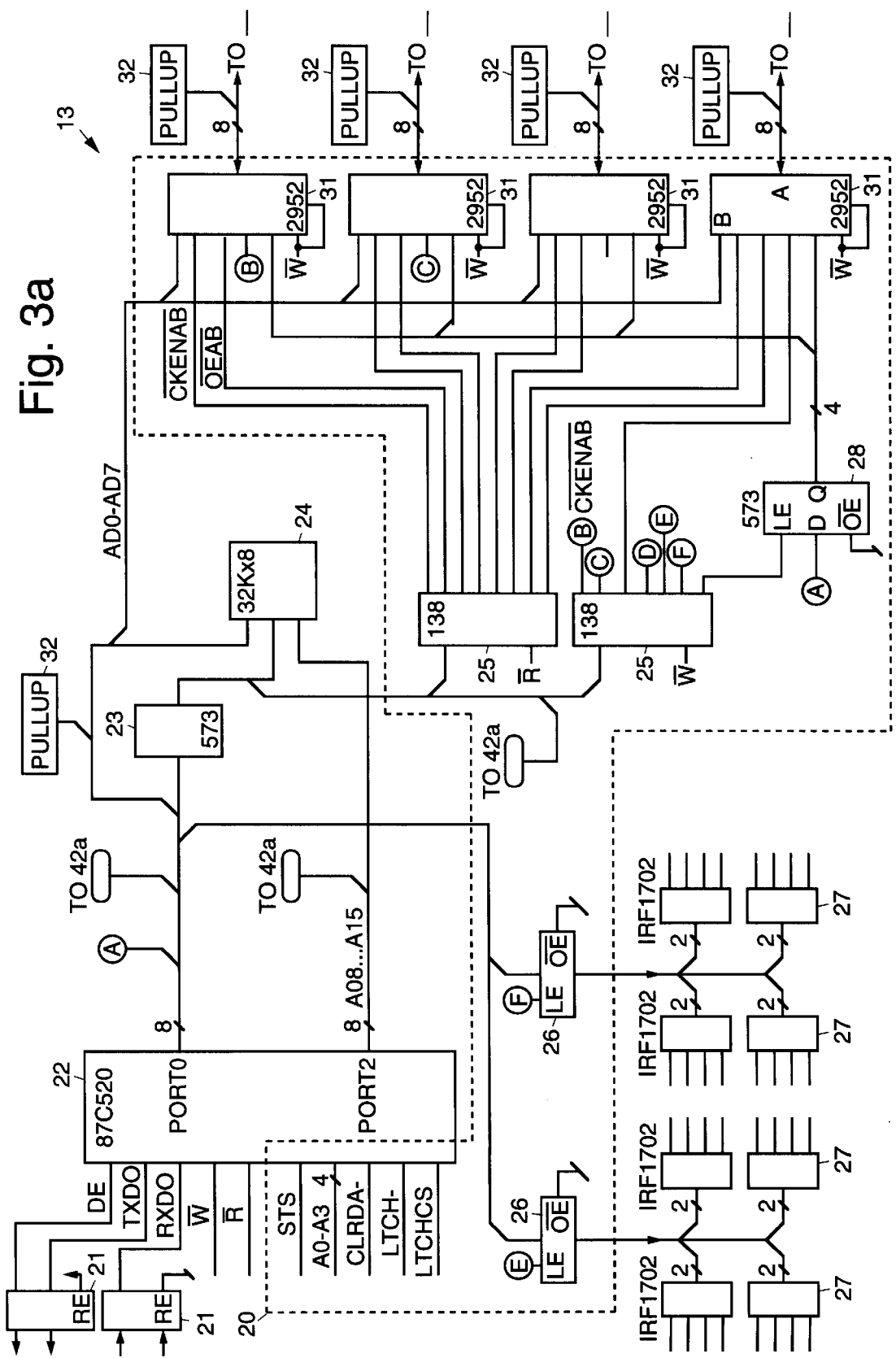
FIGS. 3a and 3b show a detailed schematic of embodiments of the system of FIG. 1.
Figure 3B:
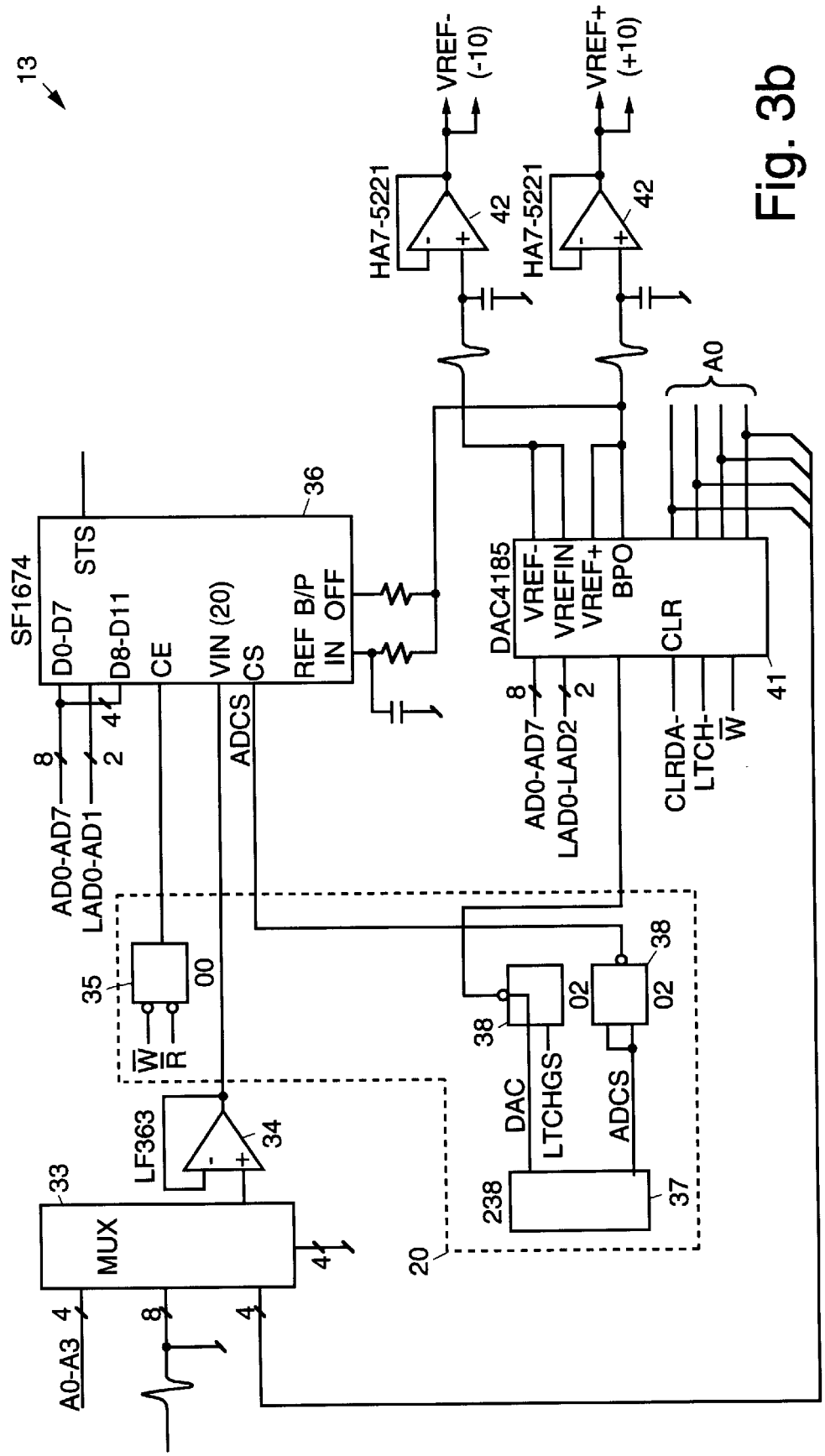

FIGS. 3a and 3b show a detailed schematic of two embodiments of the system 10 of FIG. 1, and in particular the circuit shown in the layout of FIG. 2. The two embodiments implement the same circuit, but one uses discrete logic while in the other, the logic is contained in a programmable gate array 20 (encircled by the dashed lines in FIGS. 3a and 3b). A detailed description of the circuits of FIGS. 3a and 3b will not be provided, in that the circuits should be readily understood by those skilled in the art.

FIG. 4 illustrates the timing of data collection and reduction for the prior art system of FIG. 1a. With reference to FIG. 4, at the top of a frame, the host computer 11 asks the circuit card assembly 13 to sample its inputs from each of the attached peripheral devices 17, whereafter the host computer 11 outputs data that will be later output from peripheral devices 17 to the circuit card assembly 13. The circuit card assembly 13 gathers inputs from the device 17 coupled thereto and then transfers the input data from each individual circuit card assembly 13b into a concentrator/conversion circuit card assembly 13a, and upon completion of the compilation sends sampled data to the host computer 11 during the remainder of the frame. This method of sampling induces significant latencies as data is hoarded until the entirety of data is collected before beginning transmission to the host computer 11. In addition transmission of the host computers 11 output data during the sample time adds additional latency. This sampling method provides at least one frame delay in data freshness.

FIG. 5 illustrates timing of data transfer between the input/output circuit card assemblies 13 and the host computer 11 of the system of 10 FIG. 1. With reference to FIG. 5, at the top of a frame, the host computer 11 request inputs from the circuit card assembly 13, whereafter the circuit card assembly 13 gathers inputs from the device 17 coupled thereto and then transfers the input data to the host computer 11. The host computer 11 converts the data into usable format and immediately uses it for each ongoing simulation, for example. Then the host computer 11 outputs data to the circuit card assembly 13. After receipt of each outgoing data, the circuit card assembly 13 transfers the output data to each peripheral device 17 as required. Significant time lost due to prior art type transfers shown in FIG. 4 is saved due to a reordering of priorities within the communications and sampling architectures. Testing has shown that a prior art system 10a operating at 60 Hz would have a data latency of approximately one complete frame. The present invention provides latencies of less than 1 msec while using IEEE 1394 interfaces running at 100 MHz, which is significantly less than the 16+ msec latency for the prior art system 10a.

Thus, a daisy-chainable input/output circuit card assembly that provides communication between a host computer and peripheral devices using a plurality of communication protocols has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A federated computational input/output system for interfacing a host computer to multiple input and output peripheral devices, said system comprising:

a host computer comprises a daisy-chainable bus; and a plurality of substantially identical federated computational input/output circuit card assemblies that each comprise the daisy-chainable bus, and wherein each circuit card assembly is individually connected to a specific peripheral device and implements an input or output function that interfaces to that specific peripheral device, and wherein each circuit card assembly is connected the host computer by way of the daisy-chainable bus;

and wherein the host computer and each of the input/output circuit card assemblies contain software that communicates over the daisy-chainable bus.

2. The system of claim 1 wherein each input/output circuit card assembly is physically located adjacent to the peripheral device to which it is connected.

3. The system of claim 1 wherein each input/output function is substantially reduced in latency from initiation of sample to data usefulness.

4. The system of claim 1 wherein the daisy-chainable bus comprises an IEEE-1394 interface.

5. The system of claim 1 wherein the daisy-chainable bus comprises an RS-232 interface.

6. The system of claim 1 wherein the daisy-chainable bus comprises an RS-422 interface.

7. The system of claim 1 wherein the daisy-chainable bus comprises an RS-485 interface.

8. The system of claim 1 wherein the daisy-chainable bus comprises a universal serial bus interface.

* * * * *